United States Patent [19]
Bunker et al.

[11] Patent Number: 6,005,220
[45] Date of Patent: *Dec. 21, 1999

[54] METHOD AND APPARATUS FOR ELECTRONICALLY CONTROLLING THE OUTPUT OF AN ENGINE DRIVEN GENERATOR WELDING POWER SUPPLY

[75] Inventors: Thomas A. Bunker, Appleton; Alan F. Smith, Fremont, both of Wis.

[73] Assignee: Illinois Tool Works Inc., Glenview, Ill.

[ * ] Notice: This patent is subject to a terminal disclaimer.

[21] Appl. No.: 09/026,759

[22] Filed: Feb. 20, 1998

Related U.S. Application Data

[63] Continuation of application No. 08/525,943, Sep. 8, 1995, Pat. No. 5,734,147.

[51] Int. Cl.⁶ .................................................. B23K 9/10
[52] U.S. Cl. ...................... 219/130.33; 219/133
[58] Field of Search ...................... 219/130.33, 133, 219/134, 137 PS

[56] References Cited

U.S. PATENT DOCUMENTS

| | | | |
|---|---|---|---|
| 2,458,658 | 1/1949 | Tyrner | 219/130.33 |
| 3,912,980 | 10/1975 | Crump et al. | 219/130.33 |
| 3,928,746 | 12/1975 | Ericsson | 219/130.33 |
| 3,961,154 | 6/1976 | Ericsson | 219/130.33 |
| 3,984,654 | 10/1976 | Hoffman et al. | |
| 4,247,752 | 1/1981 | Stringer | 219/130.33 |
| 4,314,195 | 2/1982 | Muter | 219/133 |
| 4,465,920 | 8/1984 | Hoyt, Jr. et al. | 219/130.33 |
| 4,769,754 | 9/1988 | Reynolds et al. | 219/130.21 |
| 4,870,248 | 9/1989 | Gilliland | 219/137 PS |
| 5,166,567 | 11/1992 | Kneisley et al. | 219/133 |
| 5,355,075 | 10/1994 | Wilson, III | 322/25 |
| 5,408,067 | 4/1995 | Crouse | 219/133 |
| 5,444,214 | 8/1995 | Crouse et al. | 219/133 |
| 5,734,147 | 3/1998 | Bunker et al. | 219/130.33 |

*Primary Examiner*—Clifford C. Shaw
*Attorney, Agent, or Firm*—George R. Corrigan

[57] ABSTRACT

A method and apparatus for providing a welding output is disclosed. The apparatus includes a an ac generator having a field winding, a welding output winding and an electronic field controller connected to the field winding. The controller receives a current feedback signal and a voltage feedback signal, and shapes the output curve in response to the desired output command signals. According to one embodiment the controller also receives a field current feedback signal. The controller may shape the output curves to emulate a DC generator, for example by causing the welding output V-A curves to have multiple breakpoints, and/or a substantially preset slope over a welding range wherein the preset slope does not vary over the output current range of the power supply. Also, the slope of the V-A output curve below the welding range may be different than the slope in the welding range. An auxiliary output winding having a substantially constant voltage may be provided on the generator and the generator may be either single or three phase.

18 Claims, 11 Drawing Sheets

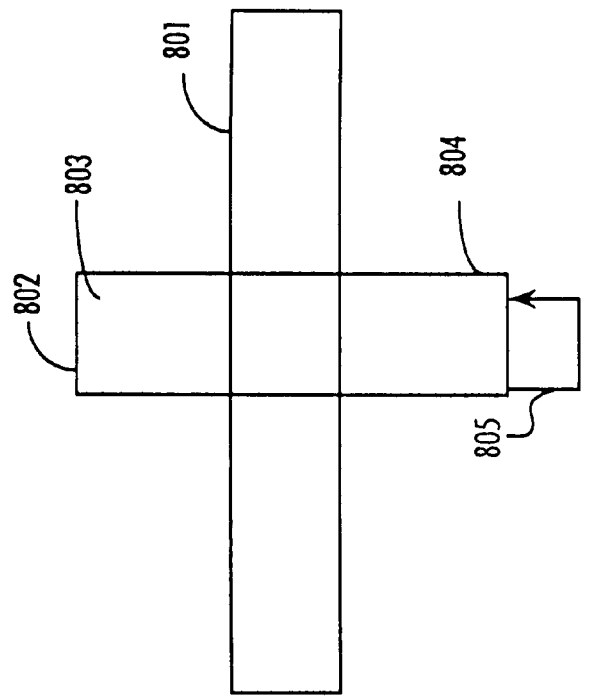
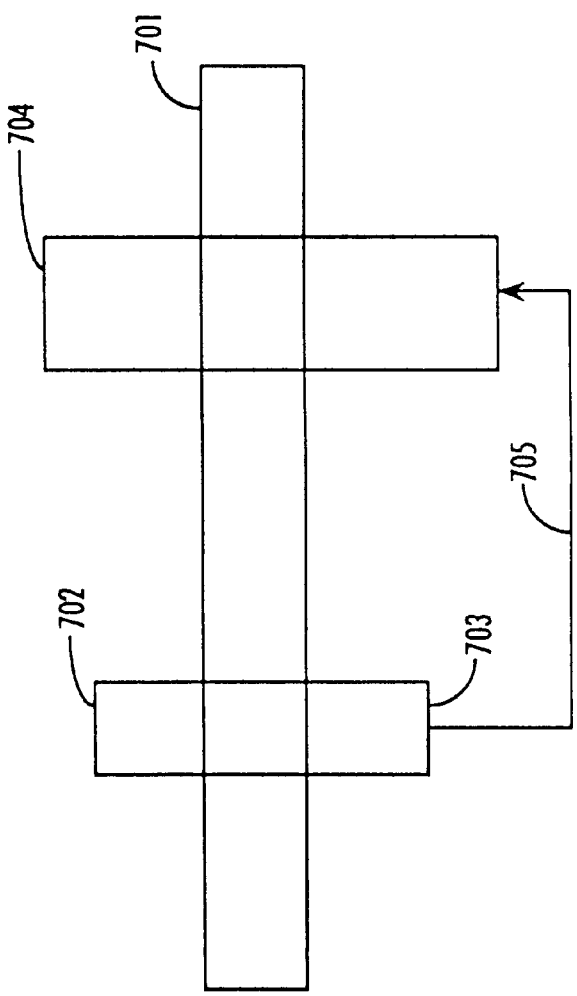

METHOD AND APPARATUS FOR ELECTRONICALLY CONTROLLING THE OUTPUT OF AN ENGINE DRIVEN GENERATOR WELDING POWER SUPPLY

This is a continuation of application Ser. No. 08/525,943, filed on Sep. 8, 1995, which issued as U.S. Pat. No. 5,734,147, on Mar. 31, 1998.

BACKGROUND OF THE INVENTION

The present invention is generally directed to the control of a generator driven welding power supply, and more particularly directed toward a method and apparatus for electronically controlling the volt-ampere (V-A) output characteristics of a generator driven welding power supply.

Welding power supplies may be driven either by a DC generator or an AC generator (also called an alternator-rectifier). An AC generator generally includes, in addition to an alternator, a reactor followed by rectifiers to provide a DC output. AC driven welding power supplies are, generally, constant current type machines and the output volt-ampere characteristic of an AC driven welding power supply typically has a very steep slope. That is, the output current is nearly constant over a varying range of output voltage. Thus, welding power supplies that are driven by an AC reactor generator are particularly suited for welding applications requiring an approximately constant current output (such as flat plate welding). However, to significantly change the current output a different tap on the reactor must be provided (and selected by the user. This is both costly and inconvenient.

AC reactor generators are less suited for some applications. For example, when welding pipes the welder often needs to control the temperature of the welding puddle. For example, the welding puddle is cooled to prevent dripping, or heated to prevent the electrode from sticking in the welding puddle when holding a tight arc. This control is typically performed by varying the distance of the electrode from the workpiece. The nearly constant current characteristic of an AC machine does not easily allow such control because current does not vary with arc length (and arc voltage).

Also, it is useful in pipe welding applications to provide a set of output V-A curves having a single open circuit output voltage, then having a sloping characteristic down to a predetermined voltage level, then having a vertical characteristic (i.e., constant current) over a range of output voltages, and then again having a sloping characteristic to provide high output current for short circuit (i.e., tight arc) conditions. Accordingly, a generator driven welding power supply having output V-A curves with multiple breakpoints or multiple slopes is desirable. Preferably, the shape of the output curves can be electronically altered and optimized for other welding applications, such as TIG, GMAW, and FCAW.

It is important to be able to control the output in welding power supplies using feedback. One AC generator welding power supply includes a field control current feedback. That is, the field current was compared to a field current set point, and adjusted in response to deviations therefrom. However, this did not necessarily mean that the output weld current was maintained at the desired level. Another feedback control for constant voltage operation was providing the output voltage as feedback to the field current control. In this manner the field current could be adjusted to maintain a constant output voltage. However, neither scheme provides for output current control. Accordingly, it is desirable to provide a generator driven welding power supply that utilizes both output current feedback and output voltage feedback to electronically control the field current.

DC generators, in contrast, have a V-A output characteristic that is linear in nature. That is, the slope of the output V-A curve is constant such that as output voltage decreases, output current increases, i.e., DC machines provide a "droop" in the V-A curve. Thus, a welder using a DC driven welding power supply can easily control the temperature of the welding puddle by varying the distance of the electrode from the workpiece. When the electrode is pulled back, the arc (output) voltage increases while the output current decreases. When the electrode is in close proximity to the workpiece, the arc voltage decreases (short circuit condition) while the output current increases. The output characteristics of DC driven welding supplies are therefore more optimally suited for applications requiring more accurate control of the welding arc current (such as pipe welding).

Prior art DC generators may also include a series compound field winding. The compound field winding may add or subtract from the field to control the output of the generator. Multiple taps on the compound winding allow for range selection. This design is costly in that an additional field winding is required.

Welding power supplies driven by either DC or AC generators have disadvantages. For example, DC generators are generally more expense and difficult to manufacture than AC generators. In addition, both DC and AC driven welding power supplies generally include costly components, such as a rheostat and a range switch for selecting the maximum output current and slope of the V-A curve, respectively. The AC driven power supply also includes a costly tapped reactor. Thus, it is desirable to provide a method of controlling the output V-A characteristic of welding power supplies that eliminates the disadvantages associated with manufacturing DC generators, as well as the need for a rheostat, range switch, and tapped reactor.

In addition to controlling the output V-A characteristic, there is a need for a welding power having a fast transient response. A fast transient response is desirable because the welding puddle has a short thermal time constant and will thus chill if the output current of the welding power supply does not respond quickly to changes in arc length. A chilled puddle will cause the electrode to stick, creating undesirable inclusions in the weld. The transient response of a DC driven welding supply is quicker than the transient response of an AC reactor generator, providing the user with fast changes in output current when varying the distance of the electrode from the workpiece. Thus, DC driven welding supplies are better suited for applications requiring quicker control of welding arc current. A need therefore exists for a welding power supply combining the V-A characteristic and transient response of a DC driven supply with the cost-savings attainable with an AC driven supply.

Another disadvantage of existing welding power supplies supplied by either a DC or AC generator is that neither method provides optimal control of the open circuit output voltage. An AC driven welding power supply has no inherent open circuit output voltage. A DC driven supply has an open circuit output voltage that drifts as the operating temperature of the supply changes, and that varies widely as the rheostat is adjusted from a minimum to maximum setting. An uncontrolled or variable open circuit output voltage has the undesirable feature of providing an inconsistent starting characteristic. For example, if the open circuit voltage is too low the arc may be difficult to start. A need thus exists for a welding power supply capable of providing and maintaining a stable open circuit output voltage.

Many generator driven welding power supplies provide a 110 volt auxiliary power source. Such power sources are used for hand tools, lights, etc. Because the devices powered by the auxiliary power are designed to operate using line current, it is desirable to provide a "flat" V-A curve, i.e., a constant voltage, regardless of the current draw. This is in direct contrast to the output desirable for many welding application. Accordingly, it is desirable to provide a generator driven welding power supply that provides a droop in the welding output, but a flat auxiliary output.

It is further desirable to provide a welding power supply having an output V-A characteristic that can be optimally shaped and controlled for a variety of welding applications, including both constant current applications (e.g., SMAW pipe welding, stick welding) or constant voltage applications (e.g., MIG, flux core). Such a design would, optimally, replace the rheostat, range switch, and tapped reactor of existing designs with a printed circuit board and a single control knob and an inductor. In addition, it would preferably include provisions for a fast transient response and a constant, stable open circuit output voltage. Further, the control method would hopefully be able to be used in a variety of welding power supplies, including DC generators, single-phase AC generators, or a multiple-phase AC generators driven by an engine.

SUMMARY OF THE PRESENT INVENTION

According to one aspect of the invention a method and apparatus for providing a welding output comprises a generator, including a field winding and a welding output winding and an electronic field controller connected to the field winding. The controller receives a current feedback signal and a voltage feedback signal, and shapes the output curve in response to the desired output command signals. According to one embodiment the controller also receives a field current feedback signal.

According to another embodiment the generator is an AC generator, either single or three phase. Also, the controller may shape the output curves to emulate a DC generator. An auxiliary output winding having a substantially constant voltage may be provided on the generator.

According to yet another embodiment the controller causes the welding output V-A curves to have multiple breakpoints, and/or a substantially preset slope over a welding range, wherein the preset slope does not vary over the output current range of the power supply. Also, the slope of the V-A output curve below the welding range may be different than the slope in the welding range.

Other principal features and advantages of the invention will become apparent to those skilled in the art upon review of the following drawings, the detailed description, and the appended claims.

BRIEF DESCRIPTION OF THE DRAWINGS

FIG. 7 is a schematic of one generator that may be used with the present invention;

FIG. 8 is a schematic of a second generator that may be used with the present invention;

Figure 1:
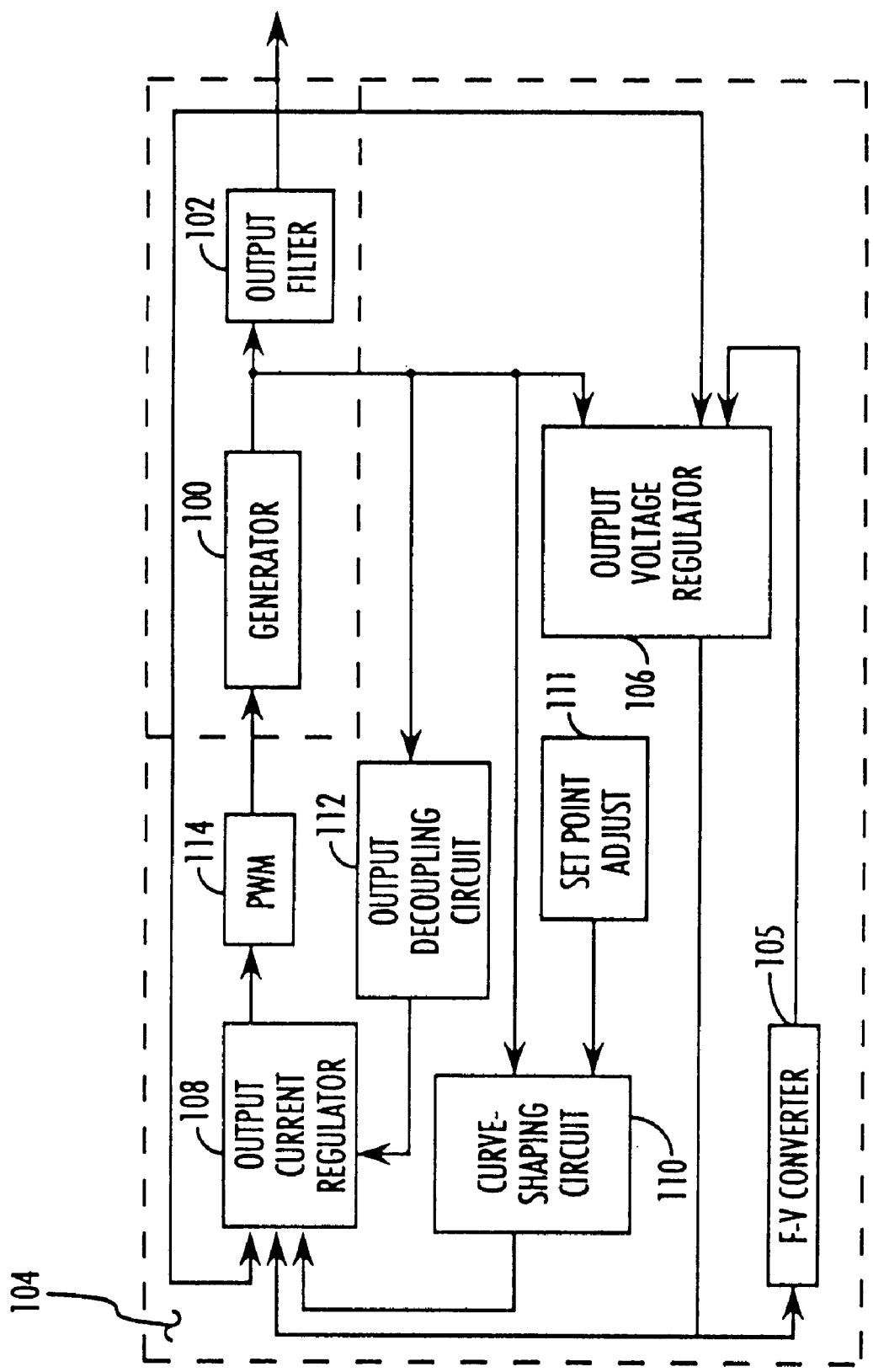
FIG. 1 is a block diagram representing a welding power supply including a generator and the associated control circuits.

Before explaining at least one embodiment of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF A PREFERRED EXEMPLARY EMBODIMENT

The present invention is directed toward a welding power supply, such as one used for pipe welding applications, and a method and apparatus for shaping the output characteristics of the power supply.

Generally, in accordance with the present invention, the output characteristics (also known as volt-ampere or V-A curves) are shaped by simultaneously monitoring the output current of the welding supply and the generator output voltage and then controlling the generator field current based on the monitored information in conjunction with control reference inputs. In addition to shaping the V-A curves, the monitor and control circuits determine the transient response of the welding power supply which permits the output current to change rapidly in response to output voltage changes. This feature provides the user with more accurate control of the welding arc current. The monitor and control circuits also provide a constant, stable open circuit output voltage that provides a consistent characteristic for igniting the welding arc. Further, the monitor and control circuits compensate and stabilize the welding power supply during short circuit conditions.

The field current controller of the present invention provides many advantages. It eliminates the necessity of the reactor present in prior art machines, it eliminates the need for range switches present in prior art machines, it allows the output V-A curves to be tailored to the desired application, and it provides a stable output.

Figure 6:
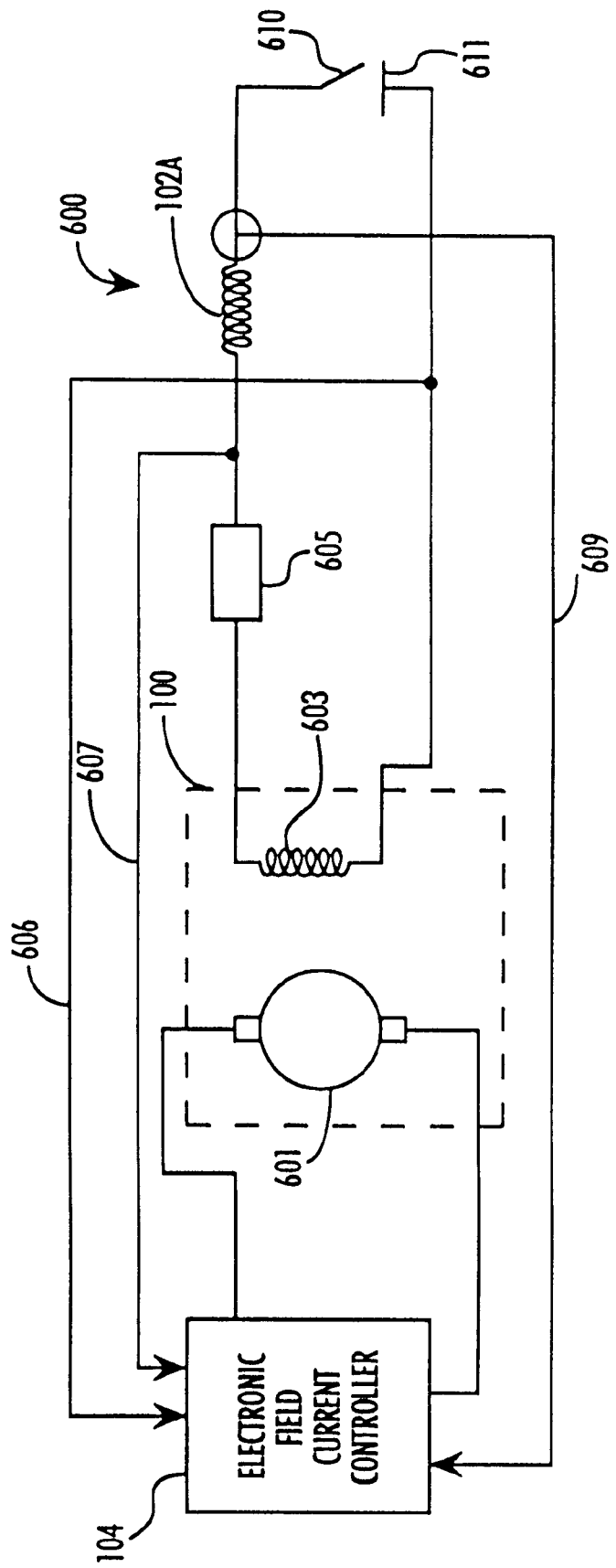
FIG. 6 is a schematic diagram of an AC generator constructed in accordance with the present invention.

Referring first to FIG. 6, an AC generator driven power supply 600, according to one embodiment of the present invention, includes a generator 100, an electronic field current controller 104, an output rectifier 605, an output inductor or filter 102A, and feedback lines 606, 607 and 609.

Power supply 600 provides current at a desired voltage to electrode 610 and workpiece 611.

Generator 100 includes a rotor 601 and a stator 603, and may be either a three phase or a single phase generator. Rotor 601 includes field windings that create the field from which power is derived by stator 603. The voltage and current derived by stator 603 is responsive to the magnitude of the field current provided to rotor 601. The output of stator 603 is provided to rectifier 605 and output inductor 102A which provides the welding output of power supply 600. The field current magnitude is responsive to electronic field current controller 104. Thus, electronic field current controller 104 indirectly controls the output of power supply 600.

Feedback from the welding output is provided on lines 606, 607 and 609. Voltage feedback is obtained from the output of rectifier 605, and is fed back to electronic field current controller 104 via lines 606 and 607. Current feedback is obtained by a current sense device and is fed back to electronic field current controller 104 via line 609. Electronic field current controller 104 uses the current and voltage feedback to control the field current in such a manner as to provide a desired output current and voltage. As described below in further detail, by using an appropriate control scheme AC generator driven power supply 600 may provide an output that closely approximates the output of a DC generator driven power supply. Such an output includes a slope in the output V-A curve, and possibly multiple breakpoints.

Referring now to FIG. 1, generator 100 and an output filter 102 provide output power to a load. As stated above, generator 100 is known in the art and may be a three phase AC generator, a single phase AC generator, or, in alternative embodiments, a DC generator. Output filter 102 includes filtering components, such as inductor 102A (FIG. 6), or capacitors and resistors, appropriately selected for the desired application, as is well known in the art.

Referring again to FIG. 1, control and monitoring circuits, designated generally as 104, include a frequency to voltage converter 105, an output voltage regulator 106, an output current regulator 108, a curve shaping circuit 110, a set point adjust 111, an output decoupling circuit 112, and a pulse width modulator (PWM) circuit 114. Output voltage regulator 106 receives inputs indicative of welding power supply output current and generator output voltage. Using these inputs, output voltage regulator 106 sets the open circuit output voltage of the power supply to a preselected value.

Curve shaping circuit 110 shapes the V-A curves in a predetermined manner based on an input indicative of the generator output voltage. Shaping circuit 110 may include proportional control circuits which determine the slope of the V-A curves or which determine breakpoints (or slope cut in points) in the V-A curves. As is well known in the art, other curve shaping characteristics may be attained that are desirable for the particular application of the power supply.

Additionally, in one alternative embodiment curve shaping circuit 110 receives as an input the output of set point adjust 111. Set point adjust 111 provides a signal that may be used to create a slope cut in point for lower voltage region of a given output V-A curve that is different from the slope in other regions of the given V-A curve. Some prior art power supplies provide a flattening of the curve at low voltages (called "dig" or "foot"), which is useful is some welding applications. The dig or foot is commonly provided by series compound DC generator driven welding power supplies, but is not easily obtained with AC generator driven welding power supplies.

The set point adjust may be used to control the voltage magnitude at which a breakpoint on a given V-A output curve is provided. In one embodiment the breakpoint varies depending upon the nominal output current. In another embodiment the voltage magnitude of the breakpoint, and/or the slope below the breakpoint, may be selected by the user.

Output current regulator 108 receives as an input the output of frequency to voltage converter 105 in one embodiment. The signal from frequency to voltage converter 105 is used to control an auxiliary voltage provided by the power supply from an auxiliary winding. Frequency to voltage converter 105 operates in a manner well known to those skilled in the art and receives an input indicative engine speed. In response frequency to voltage converter 105 outputs a voltage having a magnitude responsive to the frequency of the input signal. The voltage output is used by the output voltage regulator 106. The proper auxiliary voltage is then obtained because the auxiliary voltage output is proportional (and properly scaled) with respect to the welding output. In this manner the proper auxiliary voltage is obtained for either 50 or 60 operation.

Output current regulator 108 receives inputs from output voltage regulator 106, curve shaping circuit 110, and output current feedback. Based on these inputs, regulator 108 provides an indication to PWM 114 which pulse width modulates the field voltage of generator 100. PWM 114 may operate at a frequency selected in accordance with the type of generator, and the output desired. In one embodiment the operating frequency is 4 KHz, and in another PWM 114 frequency is based on the 120 KHz ripple in the welding output. Because the field voltage is directly proportional to the field current, modulation of the field voltage controls the field current which shapes the output V-A characteristics of the welding power supply. In addition, the gain of output current and bandwidth of output current regulator 108 are selected in a conventional manner to provide the optimal transient response of the welding power supply for the particular welding application.

A 60 Hz PWM frequency may advantageously use the ripple in the welding output as the reference signal for modulating the output. Alternatively, a 120 Hz signal, also derived from the ripple in the output, may be used.

Output current regulator 108 also receives an input from output decoupling circuit 112, in one preferred embodiment. Decoupling circuit 112 compensates for characteristics of the power supply which appear during short circuit conditions. Such characteristics can create undesirable low frequency oscillations of the power supply during short circuit conditions.

Figure 2:
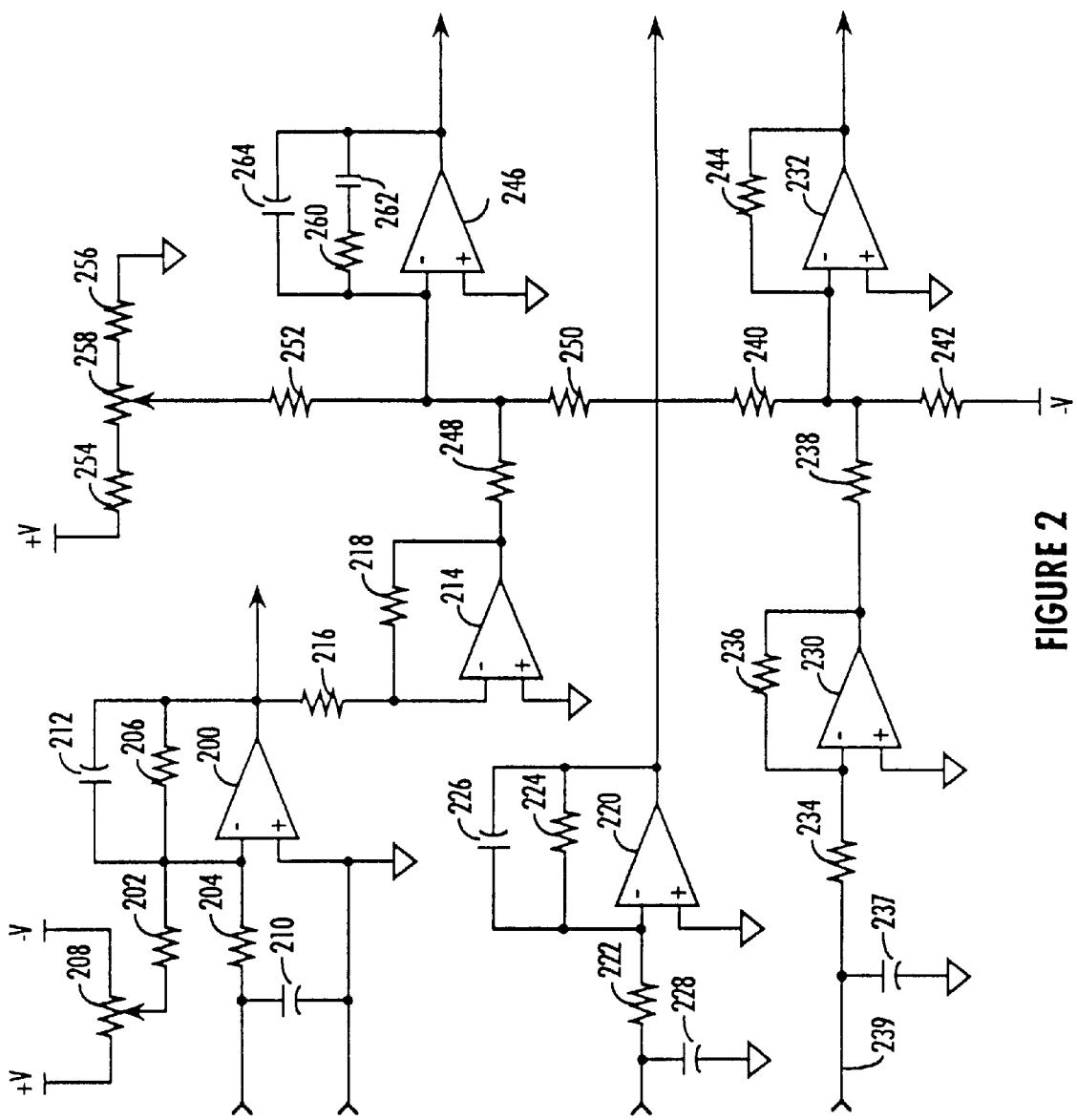
FIG. 2 is a schematic diagram of a portion of a control circuit used with the present invention.

Referring now to FIG. 2, output current feedback is buffered by an operational amplifier 200. Amplifier 200 and its associated components (resistors 202, 204, and 206, potentiometer 208, and capacitors 210 and 212) are configured as a conventional gain amplifier. The low frequency fixed gain of the amplifier is determined by the ratio of resistors 204 and 206. Potentiometer 208 nulls offsets in the current monitoring circuit. Capacitor 210 provides input noise filtering. Capacitor 212 integrates the output current feedback at higher frequencies.

When nearing the limit of the operating power range of the generator, the engine speed tends to slow down dramatically, as power demands exceed engine capabilities. Thus, the output voltage of the power supply will tend to droop as more output current is required. Thus, the purpose of an operational amplifier 214 is to reduce the peak power demands on the engine at voltages and currents beyond the normal welding range. Operational amplifier 214 is conventionally configured to have a fixed gain that is determined by associated components, resistors 216 and 218. The output of amplifier 200 provides the input signal to amplifier 214.

The negative generator output voltage is buffered by an operational amplifier 220. Amplifier 220 and its associated components (resistors 222 and 224, and capacitors 226 and 228) are configured as a conventional gain amplifier. The low frequency fixed gain of amplifier 220 is determined by the ratio of resistors 222 and 224. Capacitor 226 integrates the voltage feedback at higher frequencies. Capacitor 228 provides input noise filtering.

Operational amplifiers 230 and 232 shape the output V-A curves. Amplifier 230 determines the breakpoints (or slope cut in points) in the V-A curves by providing a signal proportional to a predetermined control reference voltage 239. Amplifier 230 is conventionally figured with a fixed gain determined by the ratio of resistors 234 and 236. Capacitor 237 filters control reference voltage 239. Amplifier 232 determines the slope of the output V-A curves. The input of amplifier 232 sums the signal provided by slope cut in amplifier 230 through resistor 238, the signal provided by voltage feedback amplifier 232 through resistor 240 and an offset voltage through resistor 232. The output of amplifier 232 then provides a signal proportional to the sum of the input signals. The magnitude of the output signal of amplifier 232 is determined by the ratio of resistors 238, 240, 242, and 244.

Operational amplifier 246 controls the open circuit output voltage of the welding power supply. After output current reaches a predetermined level, amplifier 246 will saturate and thus no longer have effect on the output voltage of the welding power supply. Amplifier 246 and its associated components are conventionally configured as a proportional/integral gain amplifier. The associated components include resistors 248, 250, 252, 254, 256, and 260, potentiometer 258, and capacitors 262 and 264. The input of amplifier 246 sums the output signal provided by voltage feedback amplifier 220 through resistor 250, the output signal provided by amplifier 214 through resistor 250 (representing a signal proportional to the output current feedback), and a preselected reference signal (through resistor 252) that may be adjusted to vary the selected open circuit output voltage. The preselected reference signal is adjusted by varying the ratio of resistors 254 and 256 and potentiometer 258.

Figure 3:
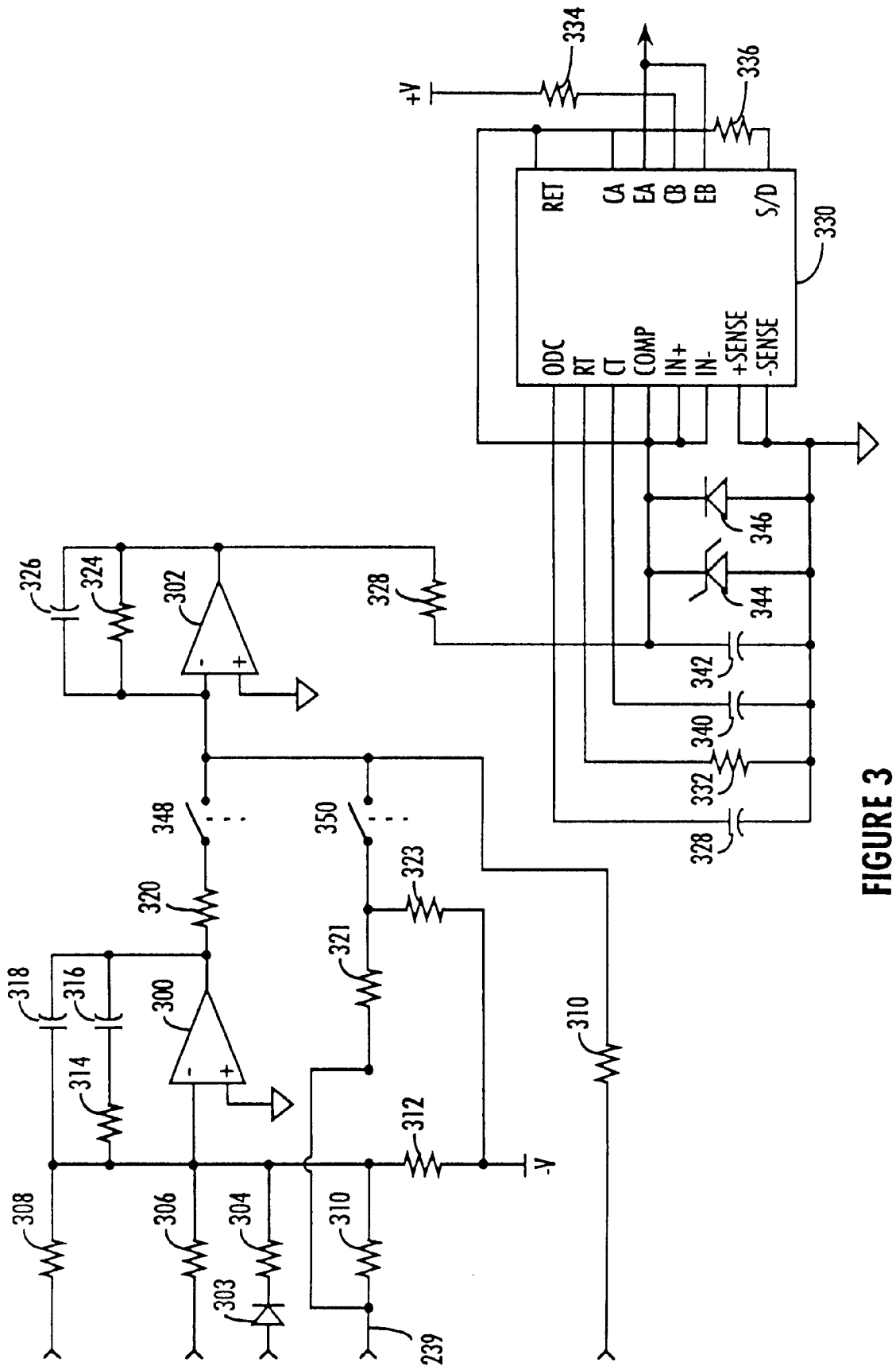
FIG. 3 is a schematic diagram of a second portion of a control circuit used with the present invention.

Referring now to FIG. 3, operational amplifiers 300 and 302 control the generator field voltage (and therefore the field current) based on output current feedback, open circuit output voltage feedback, a curve shaping signal, and generator output voltage feedback. Amplifier 300 and its associated components are conventionally configured as a proportional integral gain amplifier. The components associated with amplifier 300 include diode 303, resistors 304, 306, 308, 310, 312, and 314, and capacitors 316 and 318. The input of amplifier 300 sums the signals provided by output current feedback amplifier 200 through resistor 308, by open circuit voltage regulator amplifier 246 through resistor 306, by V-A curve shaping amplifier 232 through diode 303 and resistor 304, a control reference voltage 239 and a minimum reference voltage through resistor 312.

Amplifier 302 and its associated components are conventionally configured as a proportional gain amplifier. The components associated with amplifier 302 include resistors 320, 322, 324, 321, and 323, and capacitor 326. The input of amplifier 302 sums the signal provided by the output of amplifier 300 through resistor 320, the signal provided by the output of output voltage feedback amplifier 220 through resistor 322, and control reference signal 239 provided through resistor 321 and a minimum voltage reference through resistor 323. The output of amplifier 220 is equivalent to the derivative of the output current of the welding power supply. Thus, including this derivative in the summation results in decoupling of output characteristics of the welding power supply that can cause low frequency oscillations during short circuit conditions. The output of amplifier 302 (i.e., the scaled summation of curve shaping information and decoupling information) is then provided as an input to PWM 114 through resistor 328.

PWM 114, in one embodiment, includes a conventional pulse width modulator integrated circuit 330. The components associated with integrated circuit 330 include resistors 332, 334, and 336, capacitors 338, 340, and 342, zener diode 344, and diode 346. These components are selected in a conventional manner to provide the appropriate oscillating frequency and timing ramp to operate integrated circuit 330. The output of integrated circuit 330 modulates the field voltage of generator 100 which results in shaping of the output voltage and current of the welding power supply.

A switch 348 and a switch 350 may also be included to provide the option of switching between applications preferring constant current outputs and applications preferring constant voltage outputs. To operate in a constant current mode, switch 348 must be activated. To operate in a constant voltage mode, both switch 350 must be activated. Deactivation of switch 348 disconnects the output of amplifier 300 from the summing input of amplifier 302. Thus, amplifier 302 provides a control signal to PWM 114 based on generator output voltage feedback (i.e., the output of amplifier 220) and a voltage reference command through resistor 321 and a min voltage ref. through resistor 323. Switches 348 and 350 are not necessary to the invention, but provide for more uses of a particular welding power supply.

The alternative embodiment of PWM 114 that uses the ripple in the output as the reference signal may be implemented easily. The circuitry shown in FIG. 3 may be replaced with a comparator, transistors and associated circuit elements that produce a train of cosine pulses having a frequency of 60 Hz or 120 Hz derived from the output ripple.

Figure 4A:
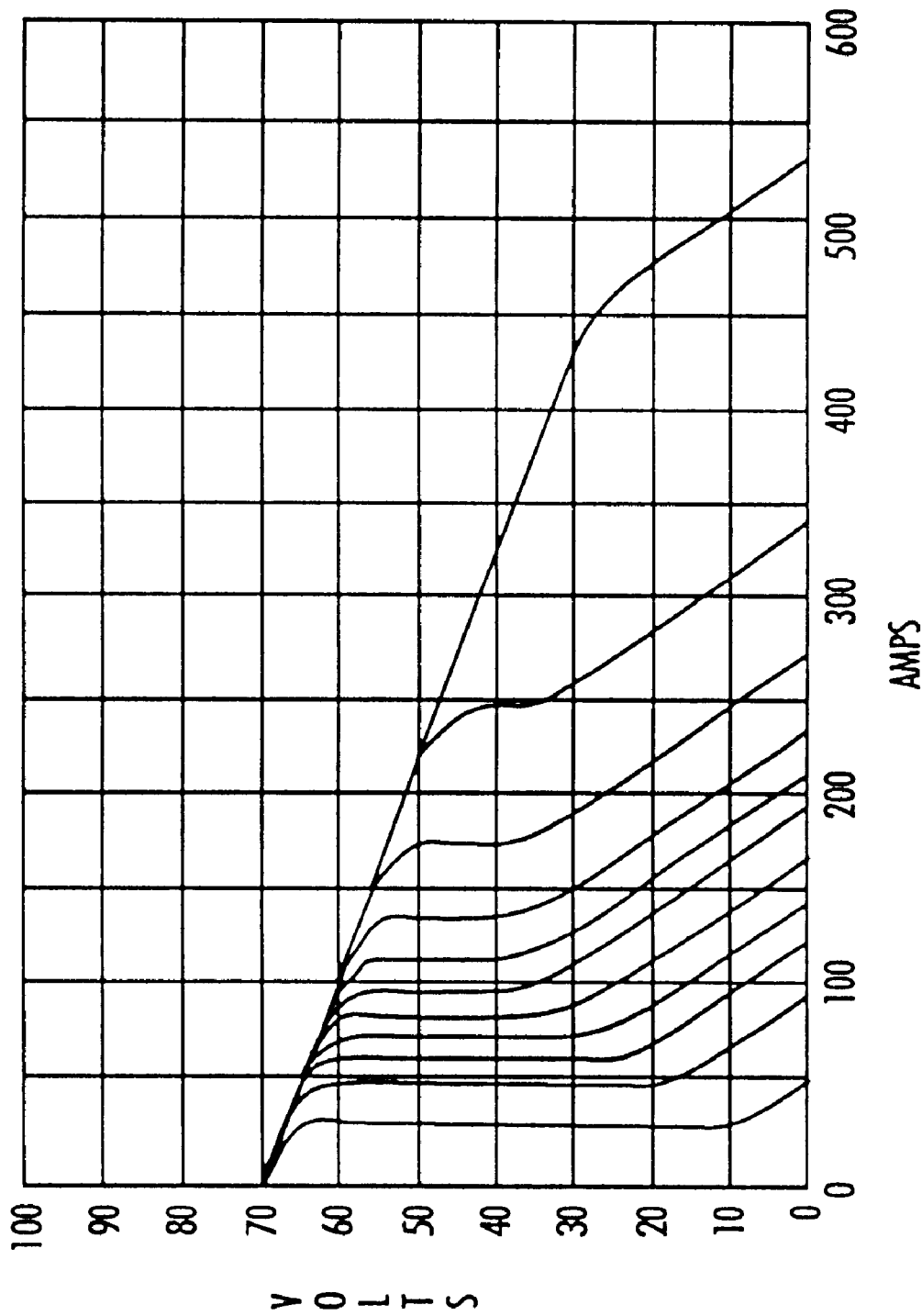
FIGS. 4A and 4B are graphs showing exemplary output V-A curves.
Figure 4B:
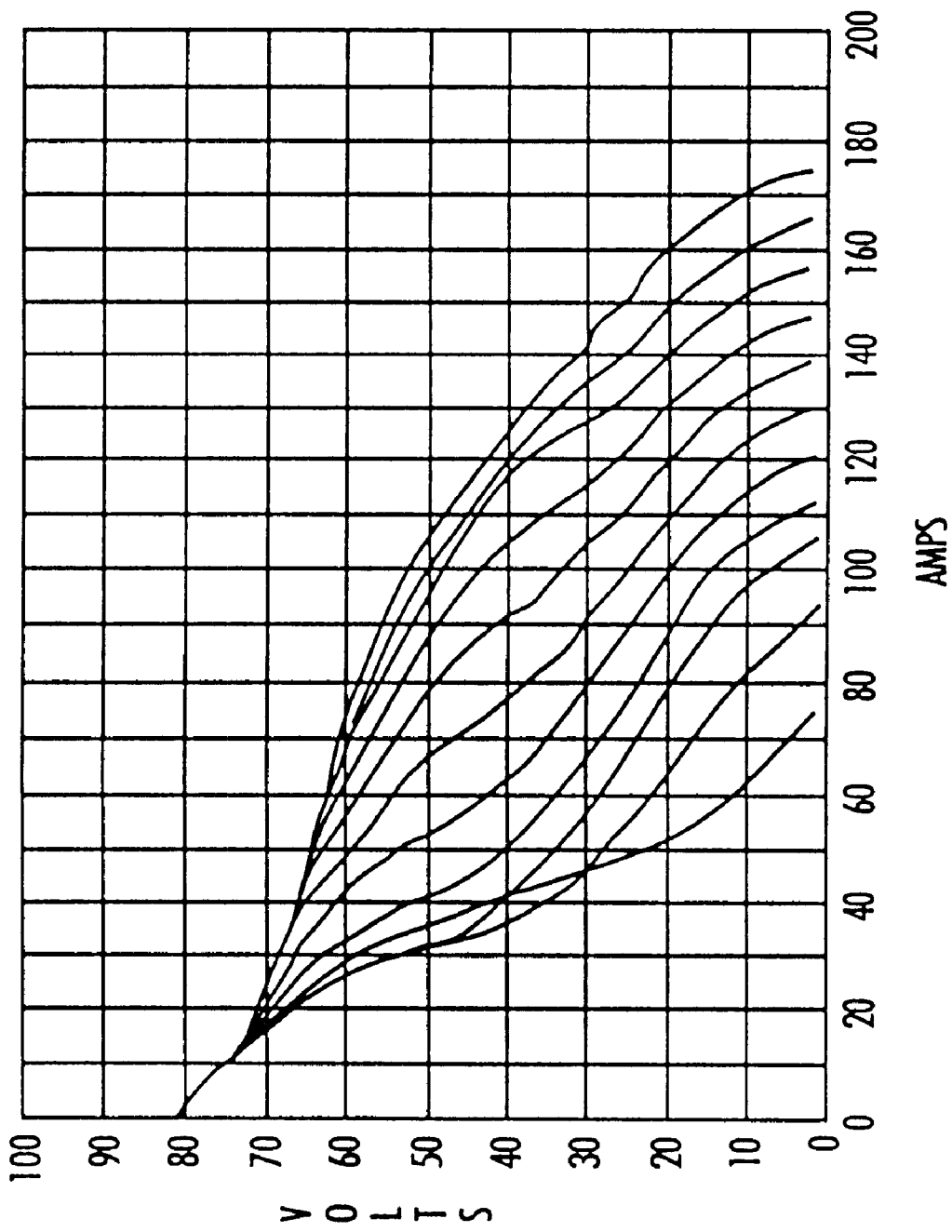

Referring now to FIGS. 4A and 4B, exemplary output V-A curves for various nominal output currents are shown. Specifically, FIG. 4A shows the curves from a three phase power supply suitable for pipe welding applications. FIG. 4B shows the output curves from a single phase power supply that incorporates the present invention and is suitable stick welding.

The curves of FIG. 4A reflect output characteristics that include an open circuit output voltage of 70 V for all selected nominal output currents. The curves also reflect the desirability of attaining generally constant output current over a range of output voltages. For lower voltages, the slope of the curves is such that increasingly higher output currents are provided as the output approaches a short circuit condition. As may be seen on FIG. 4A, each V-A curve has several slopes, and thus several breakpoints. It may also be seen that the breakpoint for the low voltage regions varies in magnitude depending upon the nominal output current. The curves on the right provide a breakpoint at approximately 10 V, while the curves on the left provide a break point at 35 volts.

Referring now to FIG. 7, a schematic of one generator design is shown. A shaft 701 is driven by an engine (not shown). Two physically separated windings are disposed on, and rotate with, shaft 701. Winding 704 is the winding that provides the welding output, and receives a field current on input 705. The field current is derived from a physically separated exciter winding 703. Wound with exciter winding 703 is auxiliary winding 702. Auxiliary winding 702 is used to provide a 110/120 volt auxiliary power source, commonly used for hand tools, lights, etc. Auxiliary winding 702 provides a typical AC output (i.e., constant voltage) because devices using auxiliary power are typically designed to operate using line current. A generator that inherently provides such an output may be utilized according to the present invention, even though such output is not desirable for welding. However, according to the present invention, the welding output may be controlled using electronic field control. Thus, even though the auxiliary supply has a flat V-A curve, the welding output may have a desirable slope.

Another embodiment of the generator is shown in FIG. 8, and includes three commonly wound windings, auxiliary winding 802, weld winding 803 and exciter winding 804. The exciter current is provided on line 805 from exciter winding 804 to weld winding 803. All three windings are mounted on shaft 801.

Figure 9:
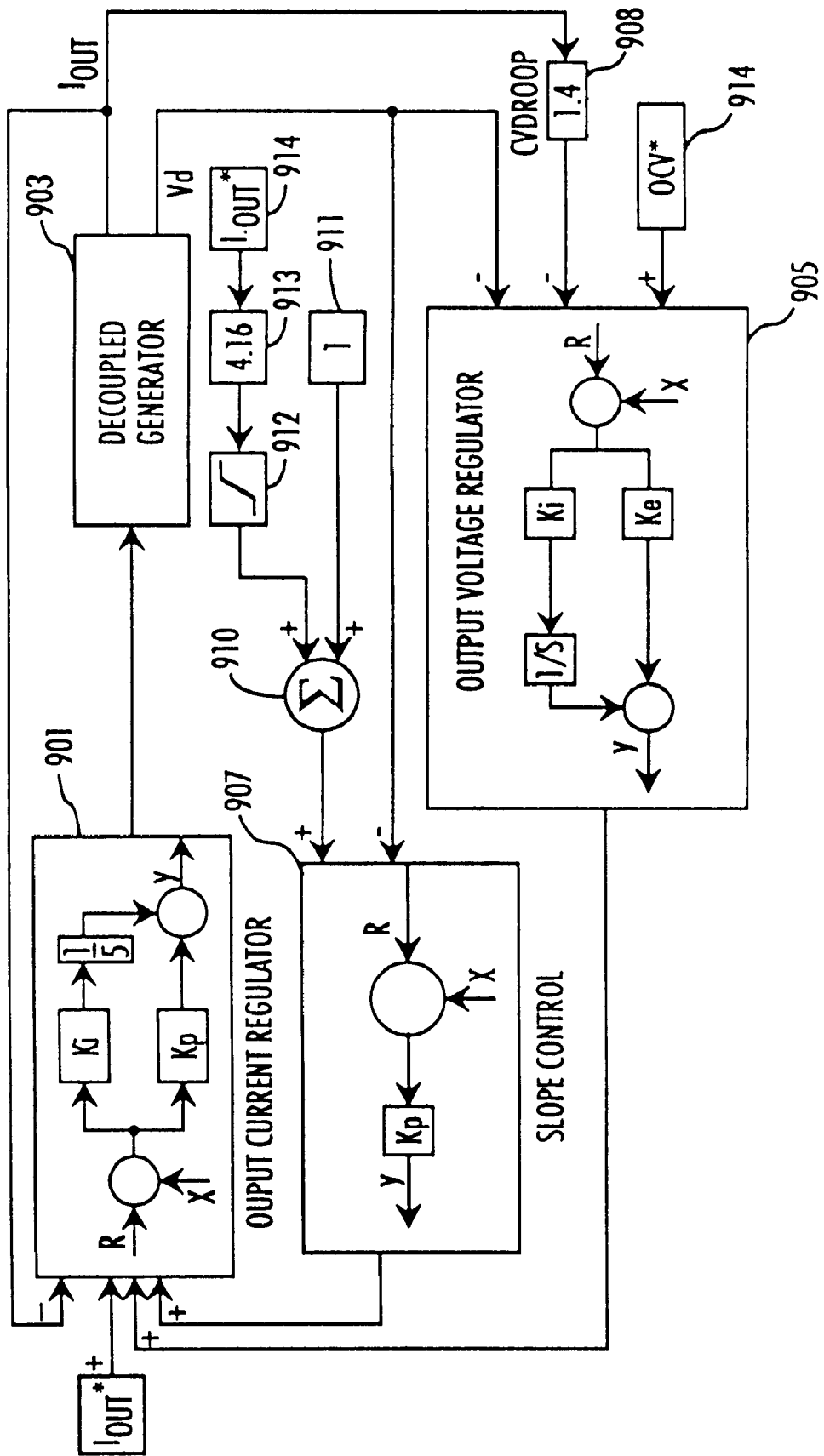
FIG. 9 is a block diagram model of the complex frequency domain implementation of the system of one embodiment of the present invention.

Referring now to FIG. 9, a block diagram model shows the complex frequency domain implementation of the system of one embodiment. The model is linear and approximates the control circuits, the electronics and the generator. The model includes as blocks an output current regulator 901, a decoupled generator 903, an output voltage regulator 905, and a slope control 907. Feedback signals Iout and Vd are provided (as described in more detail below), and user selected reference signals Iout* and OCV* represent the nominal (selected) current and the selected open circuit voltage.

Generally, FIG. 9 shows that three control blocks are used. Output current regulator 901 sets the output current, slope control 907 determines the slope of a given V-A curve over a predefined range of output currents, and output voltage regulator 905 determines the output voltage. Decoupled generator 903 represents the physical system including the generator, output inductor, and some electronics.

Output current regulator 901 is a proportional-integral regulator, and receives as inputs a current feedback signal (Iout) which is representative of the output current, a current reference signal indicative of the user selected (nominal) current (Iout*), the output of output voltage regulator 905 which is responsive to the difference between a desired and actual output voltage, and the output of slope control 907 which helps provide the slope for the output V-A curve. These four inputs are summed within output current regulator 901. The sum is provided to multiplier Ki where it is scaled for the integral portion of the control, and then integrated in the 1/s block. The sum of the four inputs is also scaled by Kp for the proportional portion of the control. The integral and proportional signals are added and a P-I control output error signal is thus provided. One skilled in the art will recognize that any number of circuits, analog, digital, or a combination thereof, may be used to implement output current regulator 901.

Figure 10:
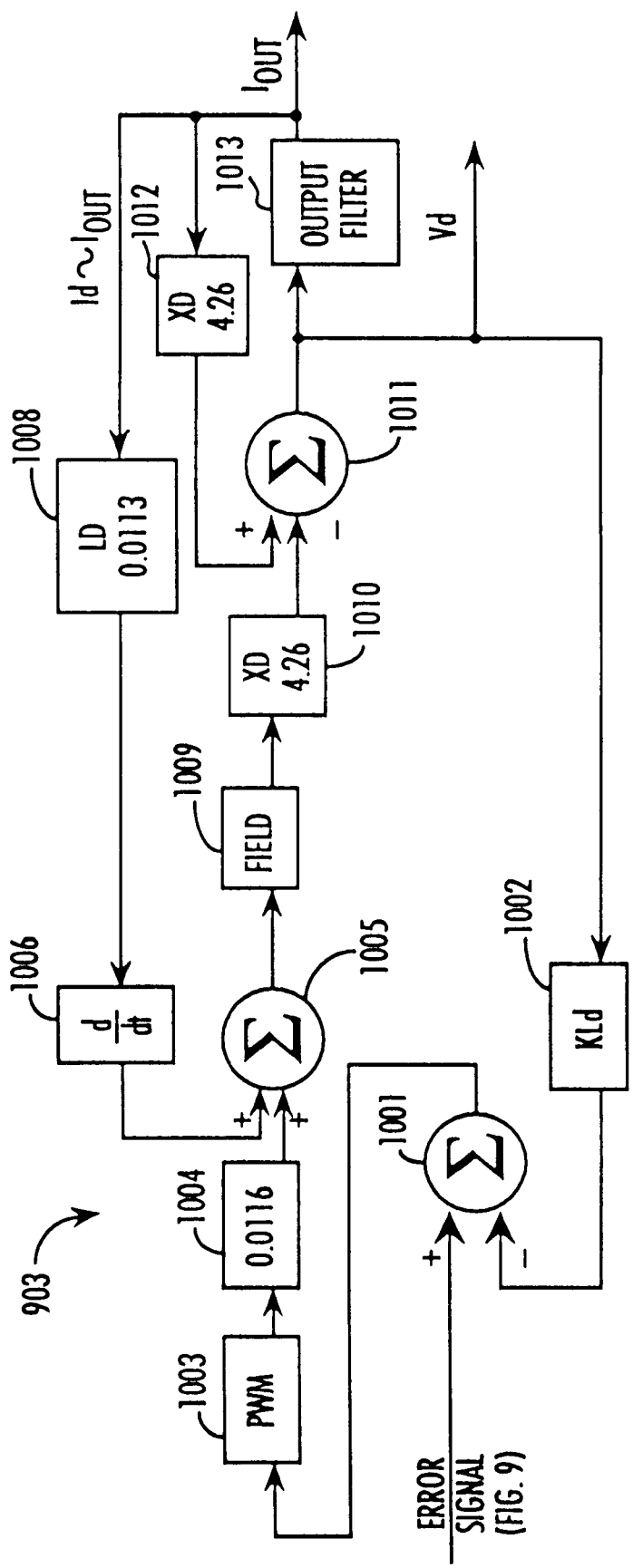
FIG. 10 is a block diagram model of the complex frequency domain implementation of the decoupled generator used with one embodiment of the present invention.

The output of output current regulator 901 error signal is provided to decoupled generator 903, which is shown in detail on FIG. 10. Decoupled generator 903 receives as an input the error signal from output current regulator 901 (FIG. 9) in a summer 1001. Summer 1001 also receives on an inverting input the output of a decoupler 1002 (which stabilizes the system during short circuits and will be described below). The output of summer 1001 is provided to pulse width modulator 1003, which modulates the field current to provide the desired output characteristics.

The output of PWM 1003 (Vfield) is scaled at block 1004. The scaling factor is 0.0116 in one embodiment, but will depend on the specific components of the power supply and the circuitry selected to implement the control. The output of scaling block 1004 is provided to a summer 1005. The other input to summer 1005 is a signal indicative of the voltage loss due to the inductance of the generator in the d axis (very approximately the derivative of the current multiplied by the inductance).

Figure 5:
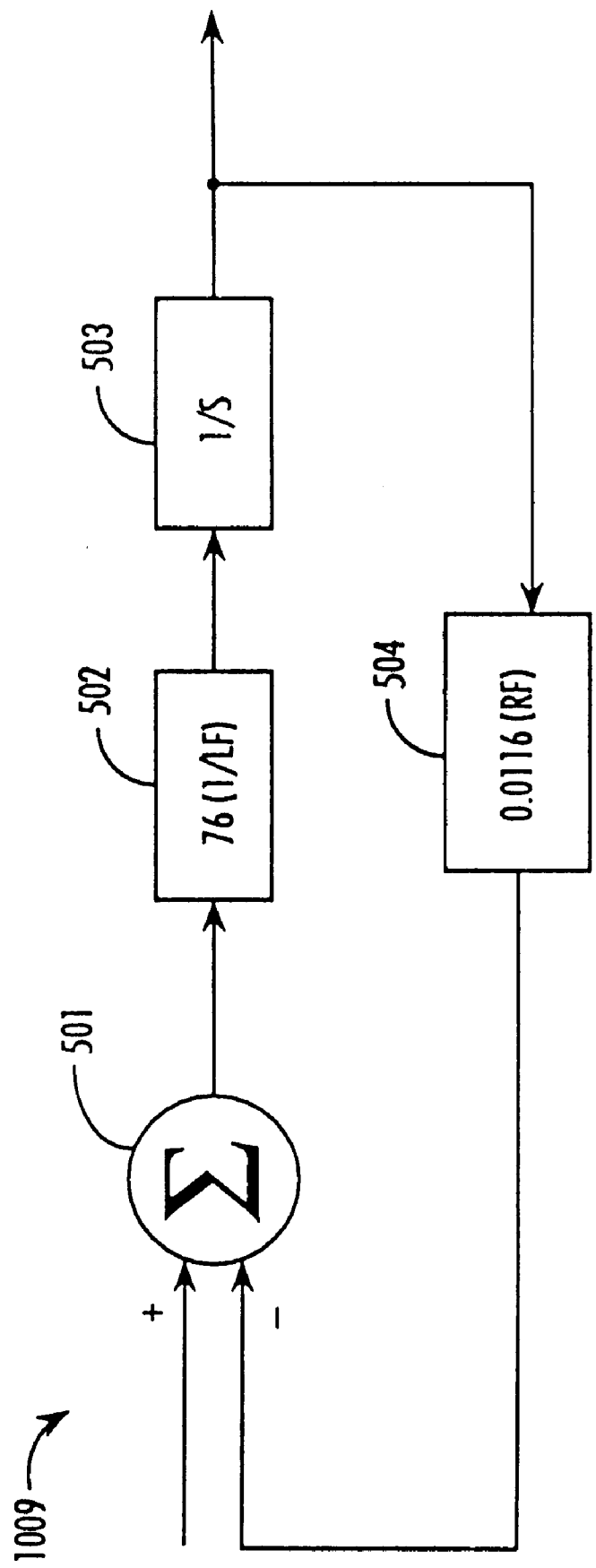
FIG. 5 is a block diagram model of the complex frequency domain implementation of the field coils of the present invention.

The output of summer 1005 is representative of the field voltage and is provided to a field block 1009. Field block 1009 is shown in detail on FIG. 5, and the input to field block 1009 is provided to a summer 501. Summer 501 also receives as a negative input a signal from a resistive block 504, which is representative of the resistive losses of the current flowing in the field coils. The output of summer 501 is provided to scaling block 502 where the signal is multiplied by 76, which represents one over the inductance of the field coils. The output of scaling block 502 is provided to integrating block 503, where the integral (1/s) of the voltage multiplied by one over the inductance is taken. The output of integral block 503 is representative of the current in the field coils, and is provided as the output of field block 1009. The output is also provided to resistive block 504, where it is multiplied by 0.0116 (indicative of the resistance of the field coils) and then fed back to summer 501.

Returning again to FIG. 10, the output of field block 1009 is provided to block 1010, where it is multiplied by 4.26, which is representative of the internal machine impedance. The result of the multiplication is representative of the generator voltage, This signal is summed at a summer 1011 with a signal from a block 1012 (representative of the impedance losses within the machine and described later). The output of summer 1011 is provided as an output of decoupled generator 903 (called Vd) and is the voltage provided by the generator.

Vd is also provided to decoupler 1002, where it is multiplied by K*Ld. Because Vd is proportional to Id multiplied by s, under short circuit conditions K*Ld*vd is proportional to K*Ld*s*Id, where the d subscript indicates the d axis. This multiplication and feedback loop is provided to stabilize the system during short circuits. Specifically, it has been found that during short circuits the coupling of the transient reactance in the d axis to the field winding is at maximum and oscillation can occur. Thus, the feedback loop including Vd multiplied by a constant (K) and Ld is scaled to cancel the d axis transient reactance term and stabilize the system during short circuits. As described above the output of decoupler 1002 is summed with the error signal at summer 1001.

Figure 11:
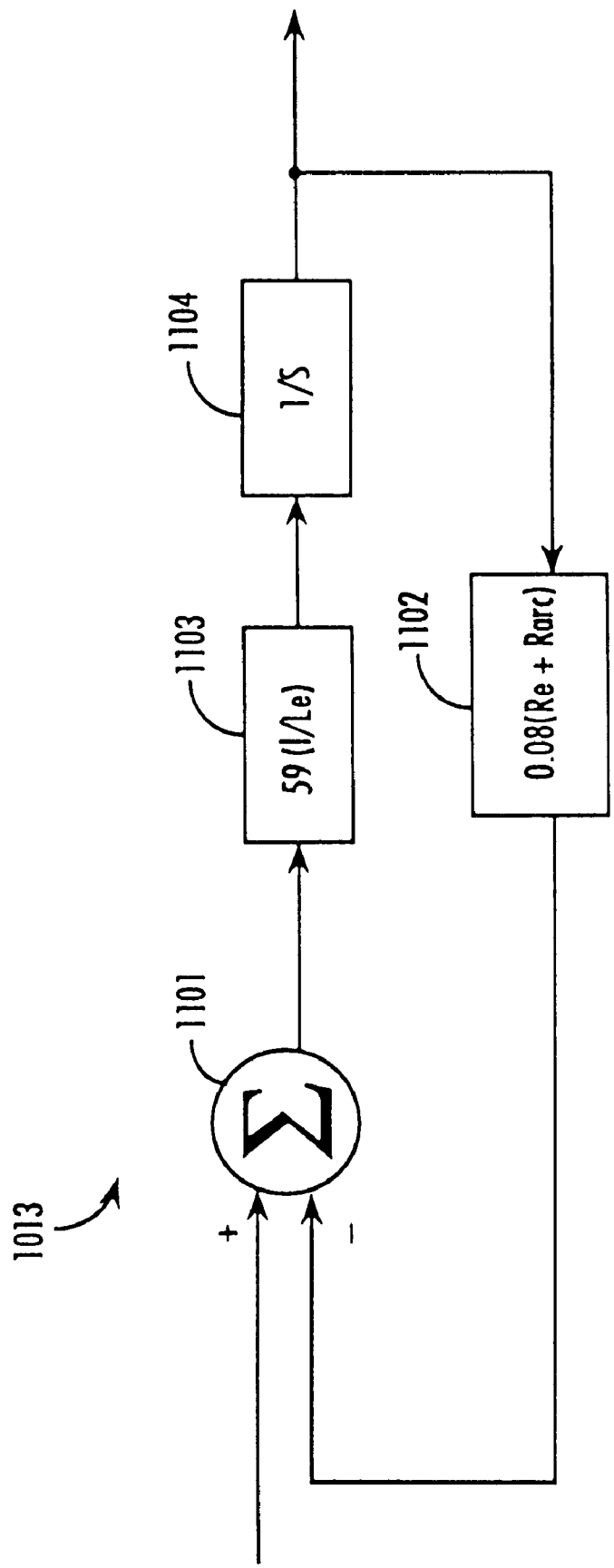
FIG. 11 is a block diagram model of the complex frequency domain implementation of the output filter used with one embodiment of the present invention.

Additionally, Vd is provided to an output filter 1013 (such as an inductor), which is shown in detail on FIG. 11. In the physical system the output filter smooths the output and provides the output current and voltage to the welding terminals. The input to output filter 1013, Vd, is provided to a summer 1101, which also receives as a negative input a signal from a resistive block 1102, indicative of the resistive losses in the arc and the inductor. The output of summer 1102 is provided to block 1103, which multiplies the signal by 59 and is representative of one over the inductance of the output filter. The scaled signal is then provided to integral block 1104, which integrates (1/s) the signal to provide a signal representative of the output current (Iout). This signal is provided back to block 1102, where it is multiplied by 0.08 (representative of the resistance of the arc plus the resistance of the output inductor). The output of integrating block 1104 is also provided as the output of filter 1013.

Referring again to FIG. 10, Iout is fed back through reactive block 1012, where the signal is multiplied by 4.26, which is the internal machine impedance. The result of the multiplication is representative of the reactive drop in the machine, and is provided to summer 1011. The reactive drop of the machine generally causes the output to droop, however, the feedback system of the present invention can force the output to a desired level.

Additionally, Iout is provided to inductance block 1008, where the signal is multiplied by 0.0113, which is representative of the inductance of the generator in the d axis. The derivative is then taken in a block 1006, to provide a signal representative of the voltage drop due to the generator d axis inductance. This loss is provided to summer 1005.

Returning now to FIG. 9, the current output of decoupled generator 903 (Iout) is provided back to current regulator 901 and (as will be described later) to a gain block 908, which provides for the cv droop of the machine. Additionally, the voltage output of decoupled regulator 903 (Vd) is provided as an input to slope control 907 and (as will be described later) to output voltage regulator 905.

Slope control 907 also receives as an input the output of a summer 910, which (as will be described below) is derived from the user selected (or nominal) current. Generally, slope control 907 is a proportional control, and provides the slope of the output V-A curve. The two inputs received by slope control are added and the difference is scaled by a constant Kp. The output of summer 910 is the desired cut in point for the slope of the V-A curve.

The output of block 914 is provided to scaling block 913, where it is scaled by multiplying by 4.16. The output of scaling block 913 is provided to clipping block 912, where the signal is clipped between the maximum and minimums of the voltage rails (+/−15 volts in one embodiment). The scaled and clipped current reference signal is summed with the output of block 911 (unity in one embodiment) and is representative of the voltage at which the slope control begins to cut in, or in other words the breakpoint of the V-A output curves. The cut in voltage may be in the range of 10 volts, and will depend on the particular outputs desired from the machine, and the applications of the power supply. Thus, the output of summer 910 is representative of the desired cut in voltage, after clipping, scaling and offsetting, as it will change with the desired output current.

In the preferred embodiment the output is substantially constant current (or alternatively constant slope) below the cut in voltage. Also, in accordance with the embodiment described herein, the cut in voltage is higher for high nominal or selected currents, and lower for lower nominal currents.

Output voltage regulator 905 receives three signals as inputs, which generally represent actual and desired output voltages. Output voltage regulator 905 is a proportional-integral regulator, and provides an output to output current regulator that controls the output in such a manner as to provide a desired open circuit voltage. The inputs to output voltage regulator include the actual output voltage (Vd), the output of block 908, and the output of OCV reference 914.

Block 908 receives the signal indicative of the output current (Iout), and scales it by multiplying by 1.4 This provides the CV droop in the output V-A curves, as shown on the graphs of FIG. 4. In other words, the graphs on FIG. 4 would be substantially horizontal but for the droop (having a slope of 1.4) provided by output voltage regulator 905. Block 914 is the open circuit output voltage (OCV) reference signal and is set in the range of 70–80 volts in one embodiment. The OCV may be set as needed for the desired application, or may be user selected. Thus, output voltage regulator receives these inputs, and provides a control output using a proportional-integral control to output current regulator 901.

Thus, it should be apparent that there has been provided in accordance with the present invention a power supply that fully satisfies the objectives and advantages set forth above. Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims.

The following tables give component values for each component of FIGS. 2 and 3. Of course, these values are merely exemplary and not intended to be limiting.

FIG. 2

| REFERENCE NUMERAL | DESIGNATION | TYPE/VALUE |
|---|---|---|
| 200 | OP AMP | 347 |
| 202 | RESISTOR | 8.25M |
| 204 | RESISTOR | 1K |
| 206 | RESISTOR | 200K |
| 208 | POTENTIOMETER | 100K (25T) |
| 210 | CAPACITOR | 1 UF |
| 212 | CAPACITOR | .0022 UF |
| 214 | OP AMP | 347 |
| 216 | RESISTOR | 10K |
| 218 | RESISTOR | 10K |
| 220 | OP AMP | 347 |
| 222 | RESISTOR | 200K |
| 224 | RESISTOR | 20K |
| 226 | CAPACITOR | 0.047 UF |
| 228 | CAPACITOR | 0.01 UF |
| 230 | OP AMP | 347 |
| 232 | OP AMP | 347 |
| 234 | RESISTOR | 20K |
| 236 | RESISTOR | 100K |
| 238 | RESISTOR | 162K |
| 239 | SIGNAL | CONTROL REFERENCE |
| 240 | RESISTOR | 35.7K |
| 242 | RESISTOR | 226K |
| 244 | RESISTOR | 39.2K |
| 246 | OP AMP | 347 |
| 248 | RESISTOR | 45K |
| 250 | RESISTOR | 18.2K |
| 252 | RESISTOR | 16.2K |
| 254 | RESISTOR | 18.2K |
| 256 | RESISTOR | 16.2K |
| 258 | POTENTIOMETER | 2K (25T) |
| 260 | RESISTOR | 30.1K |
| 262 | CAPACITOR | 1 UF |
| 264 | CAPACITOR | .01 UF |

FIG. 3

| REFERENCE NUMERAL | DESIGNATION | TYPE/VALUE |
|---|---|---|
| 300 | OP AMP | 347 |
| 302 | OP AMP | 347 |
| 303 | DIODE | 1N4148 |
| 304 | RESISTOR | 100K |
| 306 | RESISTOR | 100K |
| 308 | RESISTOR | 61.9K |

FIG. 3 -continued

| REFERENCE NUMERAL | DESIGNATION | TYPE/VALUE |
|---|---|---|
| 310 | RESISTOR | 100K |
| 312 | RESISTOR | 110K |
| 314 | RESISTOR | 61.9K |
| 316 | CAPACITOR | 1.5 U |
| 318 | CAPACITOR | 0.01 UF |
| 320 | RESISTOR | 20K |
| 321 | RESISTOR | 20K |
| 322 | RESISTOR | 20K |
| 323 | RESISTOR | 200K |
| 324 | RESISTOR | 100K |
| 326 | CAPACITOR | 0.0022 UF |
| 328 | RESISTOR | 3.32K |
| 330 | INTEGRATED CIRCUIT | 3524B |
| 332 | RESISTOR | 30.1K |
| 334 | RESISTOR | 3.32K |
| 336 | RESISTOR | 10K |
| 338 | CAPACITOR | 0.001 UF |
| 340 | CAPACITOR | 0.01 UF |
| 342 | CAPACITOR | 0.001 UF |
| 344 | ZENER DIODE | 1N4732 |
| 346 | DIODE | 1N34 |
| 348 | SWITCH | DG212 |
| 350 | SWITCH | DG212 |

The embodiments of the invention in which an exclusive property or privilege is claimed are defined as follows:

1. An ac generator driven welding power supply for providing a welding output comprising:
    a generator, including a field winding and a welding output winding; and
    an electronic field controller connected to the field winding, and having a current feedback input and a voltage feedback input;
    wherein the current feedback input and voltage feedback input are disposed to receive signals representative of the welding output; and
    further wherein the electronic field controller shapes the volt-ampere output curve of the welding output, for each of a plurality of selected nominal output currents, to provide at least one breakpoint for each volt ampere curve.

2. The apparatus of claim 1 wherein the electronic field controller includes means for emulating the output of an engine driven DC generator power supply by providing welding output V-A curves having slopes substantially the same as the slopes of an engine driven DC generator power supply output V-A curves over a welding range.

3. The apparatus of claim 2 wherein the electronic field controller further includes a field current feedback input connected to receive a signal responsive to the field current.

4. The apparatus of claim 1 wherein the generator further includes an auxiliary output winding wherein the auxiliary output is substantially constant voltage.

5. The apparatus of claim 1 wherein the generator is a three phase generator.

6. The apparatus of claim 1 wherein the generator is a single phase generator.

7. The apparatus of claim 1 wherein the electronic field controller causes the welding output V-A curves to have multiple breakpoints.

8. The apparatus of claim 1 wherein the electronic field controller causes each welding output V-A curve to have a substantially constant slope over a first welding range.

9. The apparatus of claim 8 wherein the first welding range is substantially constant over an of output current range.

10. The apparatus of claim 1 wherein the slope of the V-A output curve above the first welding range may be different than the slope in the first welding range.

11. The apparatus of claim 10 wherein the slope of the V-A output curve above the first welding range may be different than the slope in the first welding range.

12. The apparatus of claim 11 wherein the slope of the V-A output curve above the first welding range may be different than the slope in the first welding range.

13. The apparatus of claim 1 wherein the electronic field controller causes the output to have a constant open circuit voltage over a first output range.

14. The apparatus of claim 1 wherein the electronic field controller includes means, having an output that shapes the volt-ampere curve, for controlling a second order system.

15. The apparatus of claim 1 wherein the electronic field controller causes the output to have a constant open circuit voltage over a first output range.

16. The apparatus of claim 1 wherein the generator does not include an external reactor.

17. The apparatus of claim 1 wherein the power supply does not include a range switch for selecting one of a plurality of maximum outputs.

18. A method of providing a welding output comprising:
    generating ac electric power using an ac generator including a field winding and a welding output winding;
    providing a current feedback input and a voltage feedback signal to a controller; and
    shaping the volt-ampere output curve of the welding output for each of a plurality of selected nominal currents in response to desired outputs and the feedback signals, to provide at least one break point for each output curve;
    wherein the step of shaping includes the step of controlling a second order system that models the inductances of the generator and welding output.

* * * * *